US012081090B2

(12) United States Patent
Hariri et al.

(10) Patent No.: US 12,081,090 B2
(45) Date of Patent: *Sep. 3, 2024

(54) SYSTEM FOR AN ELECTRIC MOTOR WITH COIL ASSEMBLIES AND INTERNAL RADIAL MAGNETIC ELEMENTS

(71) Applicant: Linear Labs, LLC, Granbury, TX (US)

(72) Inventors: Abla Hariri, Granbury, TX (US); Andrei Popov, Granbury, TX (US); Erik Hatch, Granbury, TX (US); John Langsdorf, Granbury, TX (US); Mohit Gangireddy, Granbury, TX (US)

(73) Assignee: Linear Labs, Inc., Granbury, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,115

(22) Filed: Jan. 19, 2023

(65) Prior Publication Data

US 2023/0155441 A1     May 18, 2023

Related U.S. Application Data

(63) Continuation of application No. 17/831,337, filed on Jun. 2, 2022, now Pat. No. 11,588,366.

(Continued)

(51) Int. Cl.
*H02K 3/28*     (2006.01)
*H02K 1/278*     (2022.01)
(Continued)

(52) U.S. Cl.
CPC .............. *H02K 3/50* (2013.01); *H02K 1/278* (2013.01); *H02K 1/30* (2013.01); *H02K 3/04* (2013.01);

(Continued)

(58) Field of Classification Search
CPC .......... H02K 1/26; H02K 1/141; H02K 1/146; H02K 1/274; H02K 21/14; H02K 2201/12

See application file for complete search history.

(56) References Cited

U.S. PATENT DOCUMENTS 4,104,548 A * 8/1978 Borello .................. H01F 7/145
                                                        310/46
4,214,178 A * 7/1980 Tippner ................. H02K 25/00
                                                        310/46

(Continued)

OTHER PUBLICATIONS

International Search Report and Written Opinion for International Patent Application No. PCT/US2022/32020 dated Sep. 13, 2022.

*Primary Examiner* — Daniel C Puentes
*Assistant Examiner* — Minki Chang
(74) *Attorney, Agent, or Firm* — Run8 Patent Group, LLC; Peter Miller; Alexander Rodriguez

(57) ABSTRACT

One variation of a system for an electric motor includes a rotor including magnetic elements within a body. The system also includes a stator including coil assemblies arranged about the rotor. Each coil assembly includes an outer hook element and an inner hook element. The outer hook element extends across a first axial face and an outer radial surface of the rotor. The inner hook element: extends across a second axial face of the rotor; extends partially across the inner radial surface of the rotor; and is coupled to the outer hook element to define a throat configured to locate the rotor within the coil assembly. The system includes a shaft coupled to the inner radial surface of the rotor. Furthermore, the system includes a controller configured to drive current through the coil assemblies to generate a toroidal magnetic field configured to couple the magnetic elements to rotate the rotor.

20 Claims, 9 Drawing Sheets

Related U.S. Application Data

(60) Provisional application No. 63/252,868, filed on Oct. 6, 2021, provisional application No. 63/195,764, filed on Jun. 2, 2021.

(51) Int. Cl.
  *H02K 1/30* (2006.01)
  *H02K 3/04* (2006.01)
  *H02K 3/50* (2006.01)
  *H02K 5/22* (2006.01)
  *H02K 21/14* (2006.01)

(52) U.S. Cl.
  CPC ............... *H02K 3/28* (2013.01); *H02K 5/225* (2013.01); *H02K 21/14* (2013.01)

(56) References Cited

U.S. PATENT DOCUMENTS

| | | | | |
|---|---|---|---|---|
| 4,381,181 | A | * | 4/1983 | Clegg ................ F04D 29/186 417/423.7 |
| 5,696,419 | A | * | 12/1997 | Rakestraw ............ H02K 21/24 310/155 |
| 6,252,317 | B1 | * | 6/2001 | Scheffer ................ H02K 21/12 310/46 |
| 2014/0246962 | A1 | * | 9/2014 | Smith ................ H02K 49/106 310/75 R |
| 2015/0171694 | A1 | * | 6/2015 | Walsh .................. H02K 29/03 310/156.43 |
| 2016/0043602 | A1 | | 2/2016 | Hosek et al. |
| 2016/0380496 | A1 | | 12/2016 | Hunstable |
| 2017/0214281 | A1 | | 7/2017 | Seo et al. |
| 2018/0013336 | A1 | | 1/2018 | Li |
| 2018/0166946 | A1 | * | 6/2018 | Walsh ...................... H02K 7/09 |
| 2021/0067016 | A1 | | 3/2021 | Hunstable et al. |

* cited by examiner

SYSTEM FOR AN ELECTRIC MOTOR WITH COIL ASSEMBLIES AND INTERNAL RADIAL MAGNETIC ELEMENTS

CROSS-REFERENCE TO RELATED APPLICATIONS

This Application is a continuation of U.S. Non-Provisional application Ser. No. 17/831,337, filed on 2 Jun. 2022, which is incorporated in its entirety by this reference.

Application Ser. No. 17/831,337 also claims the benefit of U.S. Provisional Application No. 63/195,764, filed on 2 Jun. 2021, which is incorporated in its entirety by this reference.

Application Ser. No. 17/831,337 also claims the benefit of U.S. Provisional Application No. 63/252,868, filed on 6 Oct. 2021, which is incorporated in its entirety by this reference.

TECHNICAL FIELD

This invention relates generally to the field of electric motors and more specifically to a new and useful system for a rotor located internally within a set of coil assemblies in the field of electric motors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
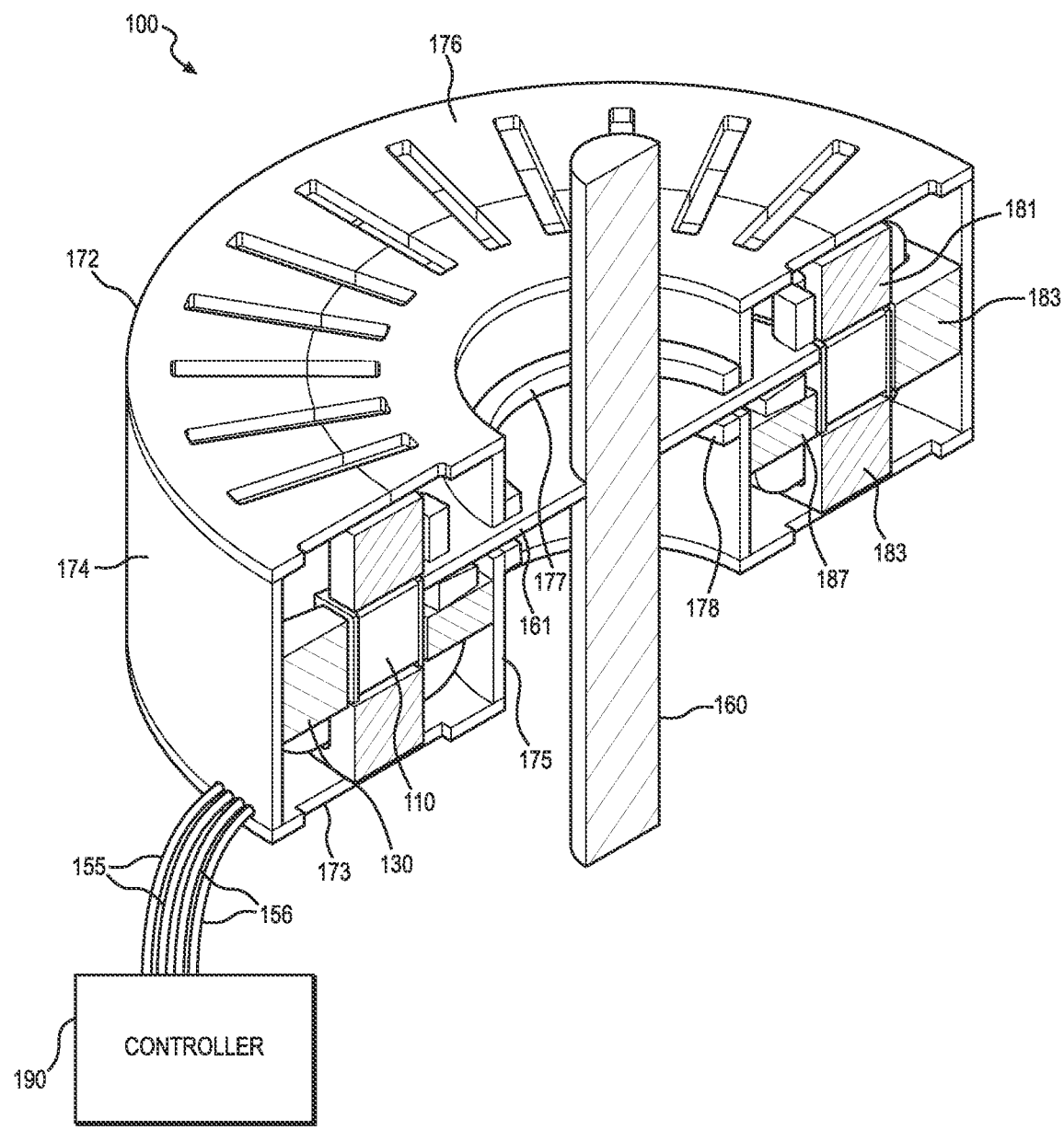
FIG. 1 is a schematic representation of the system.

As shown in FIG. 1, a system 100 includes a rotor 110 including a set of magnetic elements 112 arranged radially about a motor axis within a body 115. The body 115 of the rotor 110 defines an inner radial surface 116, an outer radial surface 117, a first axial face 118, and a second axial face 119 opposite the first axial face 118. The system 100 further includes a stator 130 including a set of coil assemblies 131 arranged in a radial pattern about the rotor 110. Each coil assembly in the set of coil assemblies 131 includes an outer hook element 133 comprising a first set of leads 155 and an inner hook element 143 comprising a second set of leads 156. The outer hook element 133 extends across the first axial face 118 and the outer radial surface 117 of the rotor 110. The inner hook element 143: extends across the second axial face 119 of the rotor 110; extends partially across the inner radial surface 116 of the rotor 110; and is arranged normal to the outer hook segment to define a throat configured to locate the rotor 110 within the coil assembly. Additionally, the system 100 includes a shaft 160 coupled to the inner radial surface 116 of the rotor 110 and aligned to the motor axis. Furthermore, the system 100 includes a controller 190 configured to drive current through the set of coil assemblies 131 to generate a toroidal magnetic field configured to envelop the rotor 110 and couple the set of magnetic elements 112 of the rotor 110, thereby rotating the rotor 110 embedded within the set of coil assemblies 131.

Figure 7:
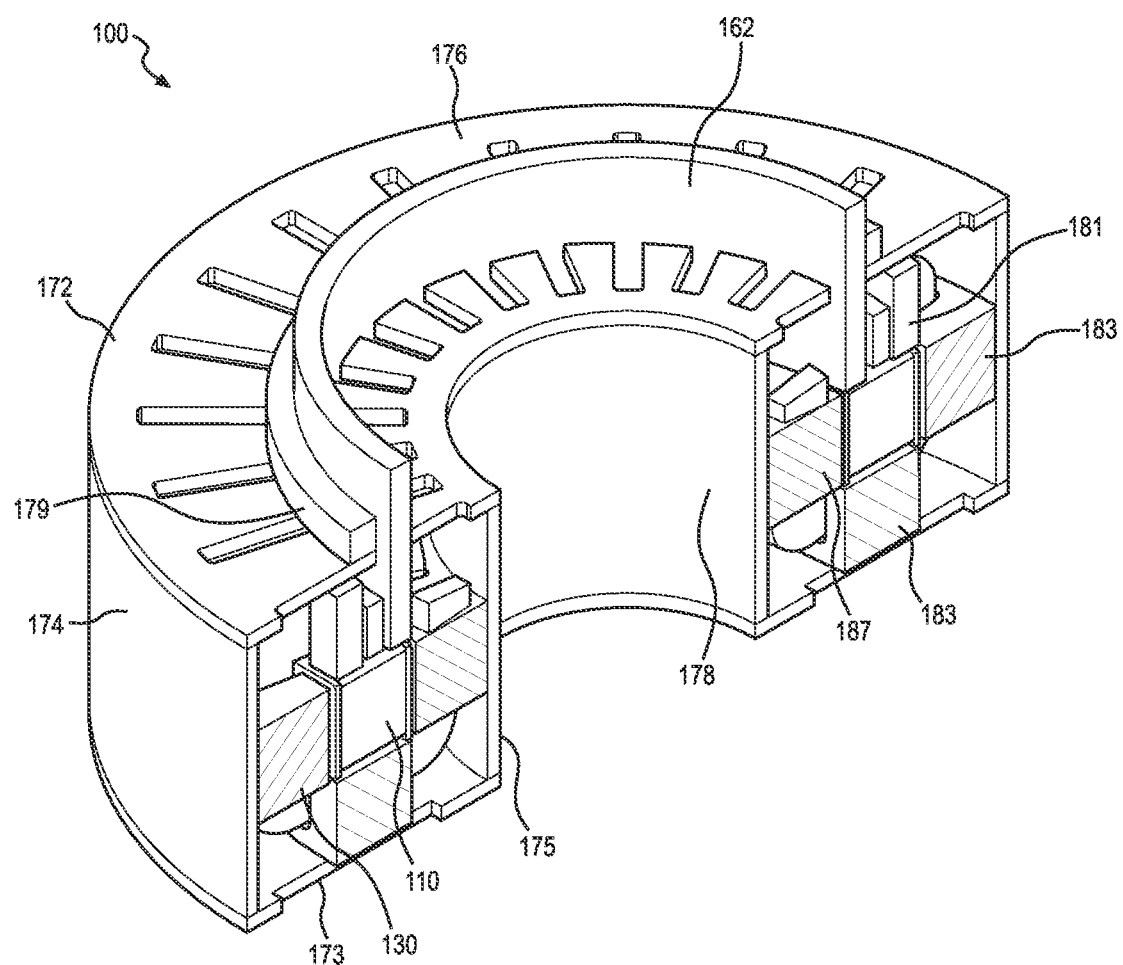
FIG. 7 is a schematic representation of the system.
Figure 8:
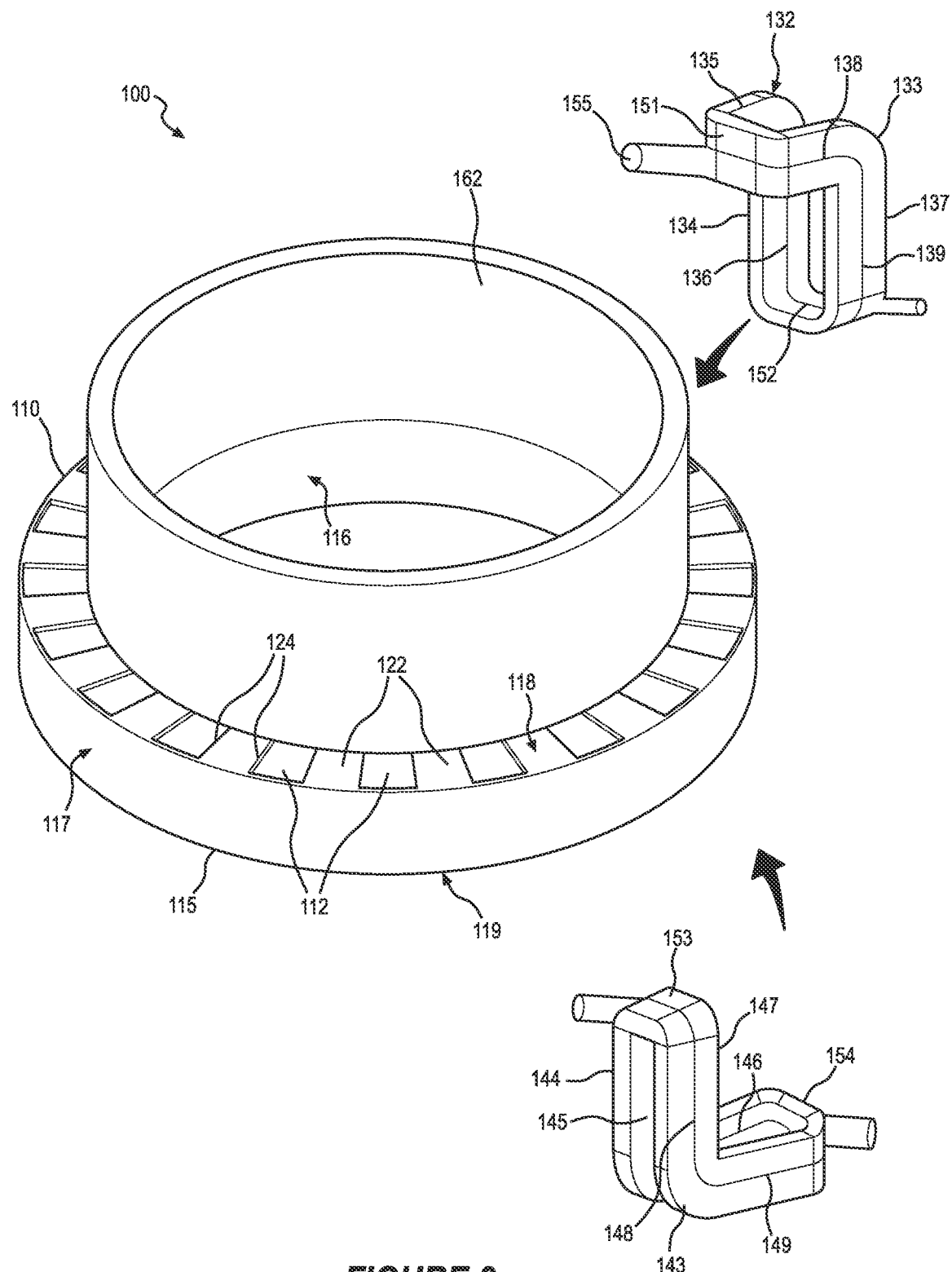
FIG. 8 is a schematic representation of one variation of the system.

As shown in FIGS. 7 and 8, a variation of the system 100 includes a rotor 110 including a set of magnetic elements 112 arranged radially about a motor axis within a body 115. The body 115 of the rotor 110 defines an inner radial surface 116, an outer radial surface 117, a first axial face 118, and a second axial face 119 opposite the first axial face 118. The system 100 further includes a stator 130 including a set of coil assemblies 131 arranged in a radial pattern about the rotor 110. Each coil assembly in the set of coil assemblies 131 includes an outer hook element 133 including a first set of leads 155 and an inner hook element 143 including a second set of leads 156. The outer hook element 133 extends: partially across the first axial face 118 of the rotor 110; and across the outer radial surface 117 of the rotor 110. The inner hook element 143: extends across the second axial face 119 and the inner radial surface 116 of the rotor 110; and is arranged normal to the outer hook element 133 to define a throat configured to locate the rotor 110 within the coil assembly. Additionally, the system 100 includes a tubular structure arranged about the first axial face 118 of the rotor 110 and aligned to the motor axis. Furthermore, the system 100 includes a controller 190 configured to drive current through the set of coil assemblies 131 to generate a toroidal magnetic field configured to envelop the rotor 110 and couple to the set of magnetic elements 112 of the rotor 110, thereby rotating the rotor 110 while embedded within the set of coil assemblies 131.

2. Applications

Generally, the system 100 can function as an electric motor including a stator 130 configured to direct magnetic fields across all surfaces of a rotor 110 located within the stator 130. In particular the stator 130 includes a set of coil assemblies 131 arranged radially about the rotor 110, each coil assembly in the set of coil assemblies 131 extending across axial faces and radial surfaces of the rotor 110. Additionally, the rotor 110 includes a set of magnetic elements 112 arranged within a body 115 of the rotor 110 configured to couple the magnetic fields generated at the set of coil assemblies 131. Furthermore, the system 100 can include a shaft 160, rigidly mounted to the rotor 110 (e.g., mounted to an inner radial of rotor), and configured to rotate about a motor axis. A controller 190 can then drive current (e.g., DC current, AC current) through the set of coil assemblies 131 in order to generate these magnetic fields to then induce magnetic flux linkage between the rotor 110 and the stator 130 across all surfaces (i.e., axial faces and radial surfaces) of the rotor 110, thereby rotating the shaft 160 rigidly mounted to the rotor 110.

In one example, each coil assembly in the set of coil assemblies 131 includes an outer hook element 133 including a first set of leads 155 and an outer hook portion including a second set of leads 156. In this example, the outer hook element 133 is formed into a first L-shaped winding structure extending across a top axial face of the rotor 110 and an outer radial face of the rotor 110. Additionally, the inner hook element 143 is formed into a second L-shaped winding structure extending across a bottom axial face of the rotor 110 and extends across an inner radial surface 116 of the rotor 110. The outer hook element 133: can be connected in series with the inner hook element 143; and is arranged normal to the inner hook element 143 to define a throat locating the rotor 110 within the coil assembly.

Therefore, the system 100 can: locate the rotor 110 entirely within the set of coil assemblies 131; generate a toroidal-tunnel of magnetic fields coupling all surfaces of the rotor 110 in order to rotate the rotor 110 within the set of coil assemblies 131; and, therefore, increase speed and torque of the electric motor without increasing a quantity of copper for the set of coil assemblies 131.

The system 100 can also include a housing 172 defining a cavity configured to locate the stator 130 and the rotor 110 within the housing 172. The system 100 can also include a set of ferrous elements 181 arranged about axial and radial sides of the set of coil assemblies 131 in order to: rigidly support the stator 130 within the cavity of the housing 172; and define sets of stator poles configured to direct magnetic fields toward the rotor 110 within the set of coil assemblies 131.

For example, the housing 172 can include: a base 173; an outer radial wall 174 arranged about an outer circumference of the base 173; an inner radial wall 175 arranged about an inner circumference of the base 173; and a cover 176 arranged over the base 173 and coupled to the outer radial wall 174 and inner radial wall 175 to define the cavity locating the stator 130 and rotor 110 within the housing 172. Furthermore, the stator 130 can include a first ferrous element 182: arranged about a bottom axial side of the set of coil assemblies 131; abutting with the base 173 of the housing 172; and defining a first set of stator poles 183 directed to the top axial face of the rotor 110. A second ferrous element 184 is: arranged about the top axial side of the set of coil assemblies 131; abutting with the cover 176 of the housing 172; and defining a second set of stator poles 185 directed to the bottom axial face of the rotor 110.

Therefore, the system 100 can: induce balanced axial forces about opposing axial forces of the rotor 110; and rigidly support the top and bottom axial of the stator 130 within the housing 172, thereby reducing vertical propagation of the rotor 110 and stator 130 within the housing 172. Furthermore, the structure of the housing 172 allows for a cooling system (e.g., liquid cooling, air cooling) to apply coolant about each surface of the housing 172, thereby rapidly reducing an internal temperature of the housing 172.

Additionally or alternatively, the system 100 can include sets of ferrous elements arranged about radial sides of the stator 130 in order to: rigidly support the stator 130 and rotor 110 within the housing 172; and define sets of radial stator poles directed to radial surfaces of the rotor 110.

In one example application, the system 100 can function as a 25-kilowatt submerged pump motor for municipal applications configured to operate at 4500 rpm. In this implementation, the system 100 can leverage the water enveloping the submerged pump motor to internally cool the rotor 110 and stator 130 within the housing 172 during operation.

3. Rotor

Generally, the system 100 100 includes a rotor 110 including a set of magnetic elements 112 arranged radially about a motor axis within a body 115 (e.g., a toroidal cylinder fabricated from iron, nickel, cobalt, or a combination thereof).

In one implementation, the body 115 defines: a first axial face 118 (e.g., a front face of the electric motor), a second axial face 119 opposite the first axial face 118 (e.g., a rear face of the electric motor), an inner radial surface 116; and an outer radial surface 117. The body 115 can further define a set of slots 124 fabricated (e.g., punched, cut) into the body 115 and configured to receive the set of magnetic elements 112. Additionally, the body 115 can define a set of pole spacers 122, each pole spacer arranged intermediately between slots of the rotor 110. In this implementation, the set of magnetic elements 112 are arranged in an alternating pole orientation (e.g., a pseudo Halbach array) within the body 115 of the rotor 110 configured to distribute magnetic flux on each of the first axial face 118, second axial face 119, inner radial surface 116, and outer radial surface 117 of the rotor 110.

For example, the set of magnetic elements 112 includes a subset of magnetic elements 112 including: a first magnetic element 113 of a first pole orientation (e.g., north-south) arranged within a first slot of the rotor 110 and adjacent a first pole spacer; and a second magnetic element 114 of a second pole orientation (e.g., south-north) arranged within a second slot of the rotor 110 adjacent the first pole spacer, such that, the opposing south pole of each magnetic element are opposing each other and therefore distribute magnetic flux evenly across all four surfaces of the first pole spacer (e.g., an top surface, bottom surface, inner surface, and outer surface of the first pole spacer). Accordingly, each of the magnetic elements in the set of magnetic elements 112 can be arranged in this alternating pole orientation about the body 115 of the rotor 110, thereby evenly distributing magnetic flux across the surfaces of the rotor 110. Additionally, in this example, the set of pole spacers 122: includes a set of sheets (e.g., soft metallic laminated sheets) arranged parallel to the flux distribution applied to the pole spacers and perpendicular a direction of rotation for the rotor 110, thereby reducing the number of Eddy currents formed within the body 115 of the rotor 110, which can reduce speed and torque of the rotor 110. Alternatively, the set of pole spacers 122 can be manufactured from iron powders to reduce formations of Eddy currents within the body 115 of the rotor 110.

Therefore, the set of magnetic elements 112 arranged within the body 115 of the rotor 110 distribute magnetic flux from the magnetic elements evenly across the first axial face 118, second axial face 119, inner radial surface 116, and the outer radial surface 117 of the rotor 110. The magnetic flux in the rotor 110 from the set of magnetic elements 112 couples with the magnetic flux generated from the set of coil assemblies 131 and therefore results in rotation of the rotor 110 within the set of coil assemblies 131.

In one implementation, each magnetic element in the set of magnetic elements 112 defines a particular shape configured to cooperate with a particular shape of the set of pole spacers 122 in order to achieve even distribution of magnetic flux across the surfaces of the rotor 110.

In one example, each magnetic element in the set of magnetic elements 112 defines a rectangular shape (e.g., a parallelepiped) congruent with a shape of the set of slots 124 on the body 115 of the rotor 110 that receives each of the magnetic elements. In this example, the set of pole spacers 122 arranged intermediate the set of magnetic elements 112 defines a trapezoidal shape. Therefore, the body 115 of the rotor 110 maintains a toroidal cylindrical configuration and the magnetic flux resulting from the pole orientations of the magnetic elements are distributed evenly across all surfaces of the pole spacers. Alternatively, each magnetic element in the set of magnetic elements 112 defines a trapezoidal shape and the set of pole spacers 122 arranged intermediate the set of magnetic elements 112 define a rectangular shape (e.g., a parallelepiped).

In one implementation, the set of magnetic elements 112 within the rotor 110 and the set of coil assemblies 131 defines a ratio wherein a quantity of magnetic elements in the set of magnetic elements 112 is greater than a quantity of coil assemblies in the set of coil assemblies 131. In this implementation the quantity of magnetic elements and coil assemblies for this ratio depend on the desired torque and desired speed for the shaft 160. For example, an increase in the quantity of magnetic elements in the ratio can result in an increase in torque and decrease in speed for the shaft 160. Alternatively, a decrease in the quantity of magnetic elements in the ratio can result in a decrease in torque and increase in speed of the shaft 160.

Therefore, the rotor 110 can be fabricated to achieve a target torque and a target speed with a relatively low number of magnetic elements (e.g., 20 magnetic elements), thereby reducing costs of manufacturing the system 100.

3.1 Shaft

Figure 2:
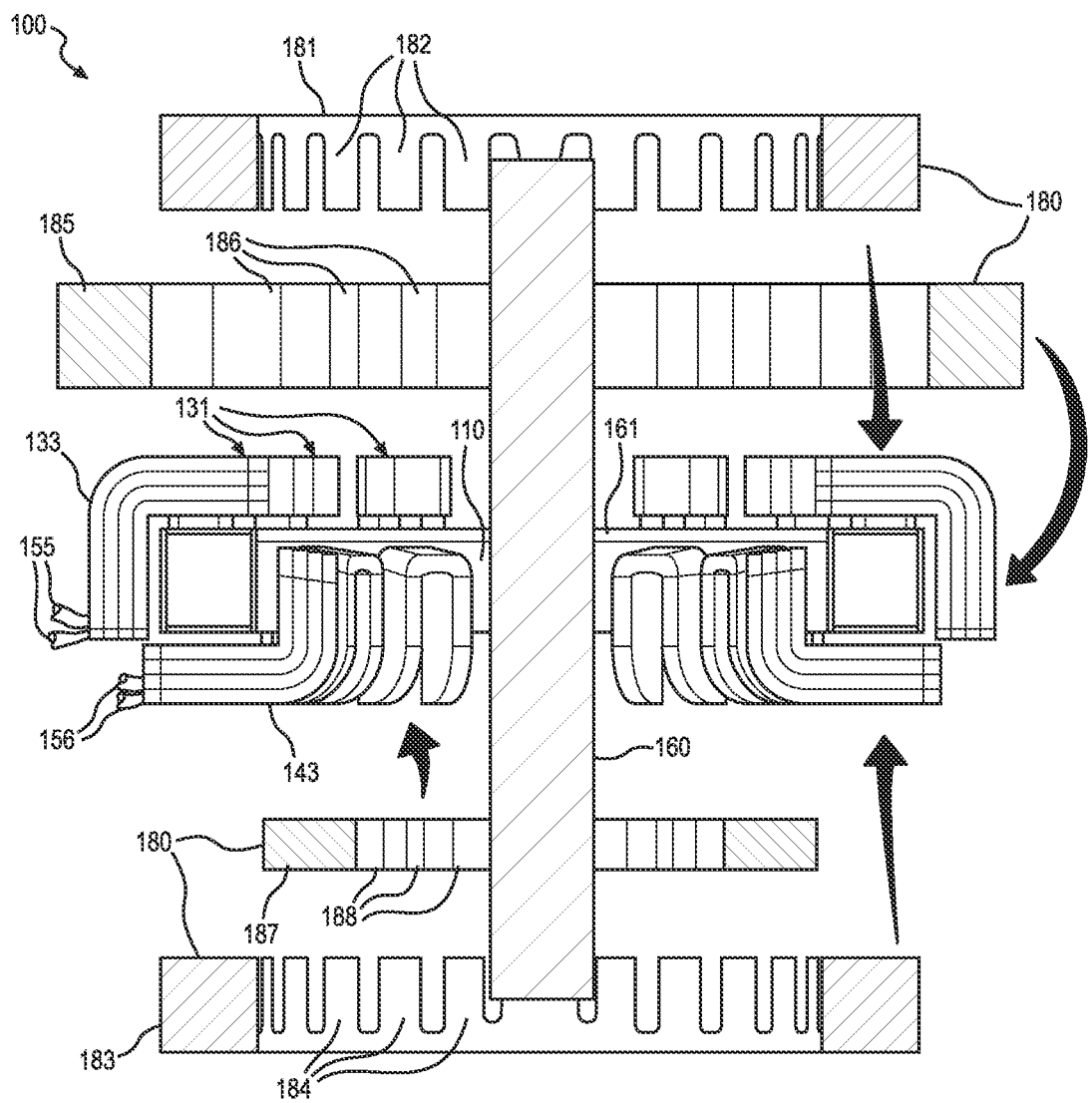
FIG. 2 is a schematic representation of the system.
Figure 4:
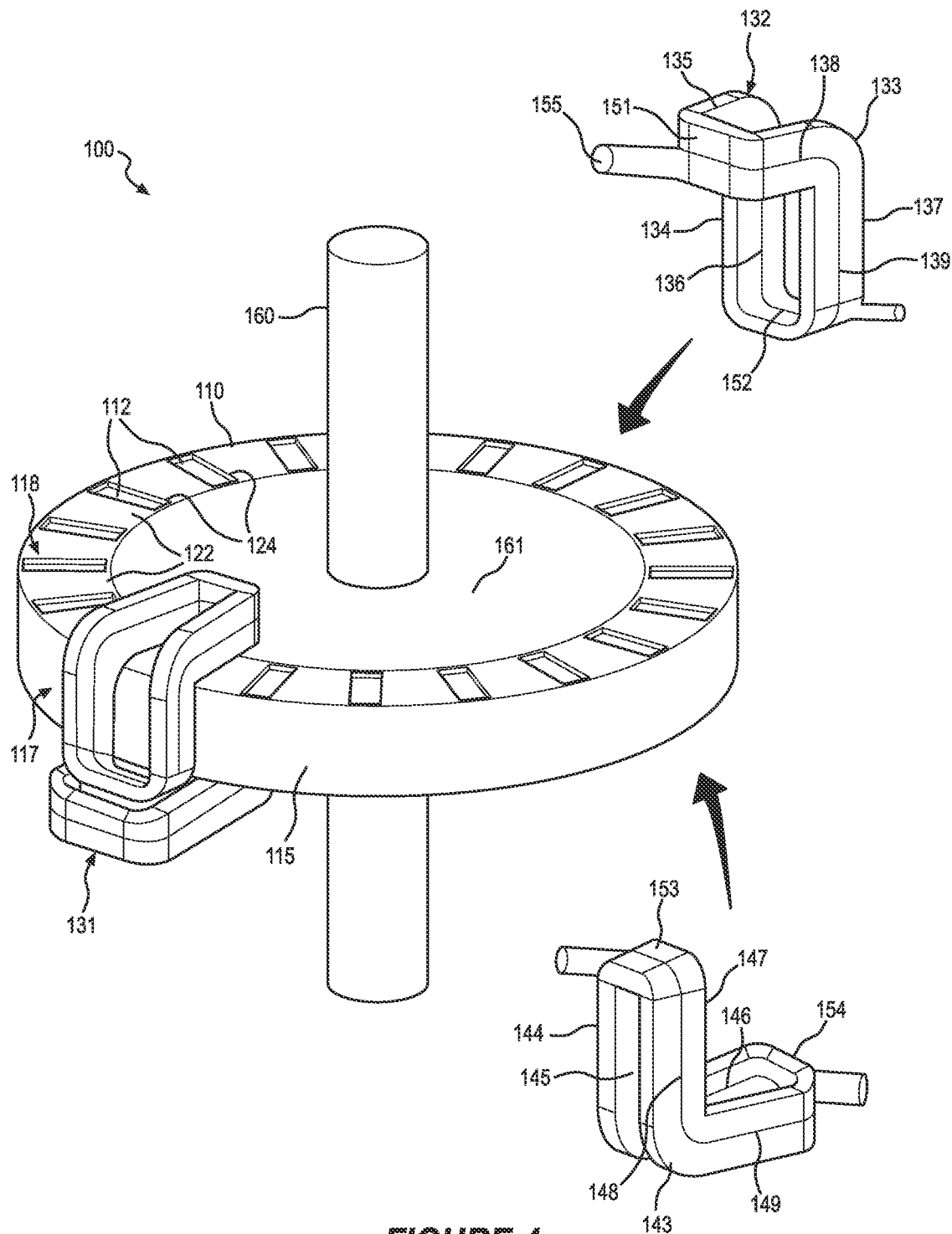
FIG. 4 is a schematic representation of the system.
Figure 5:
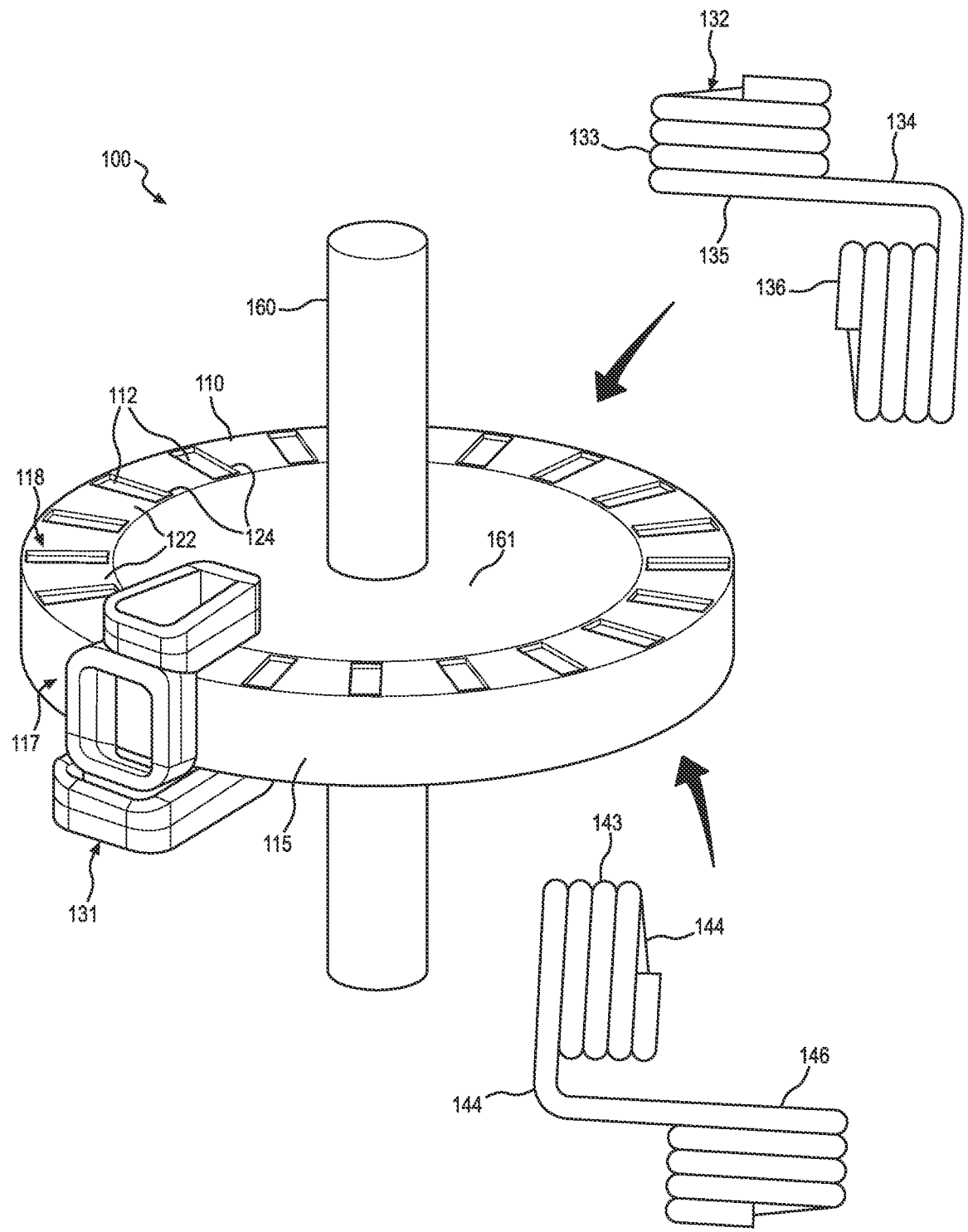
FIG. 5 is a schematic representation of the system.
Figure 6:
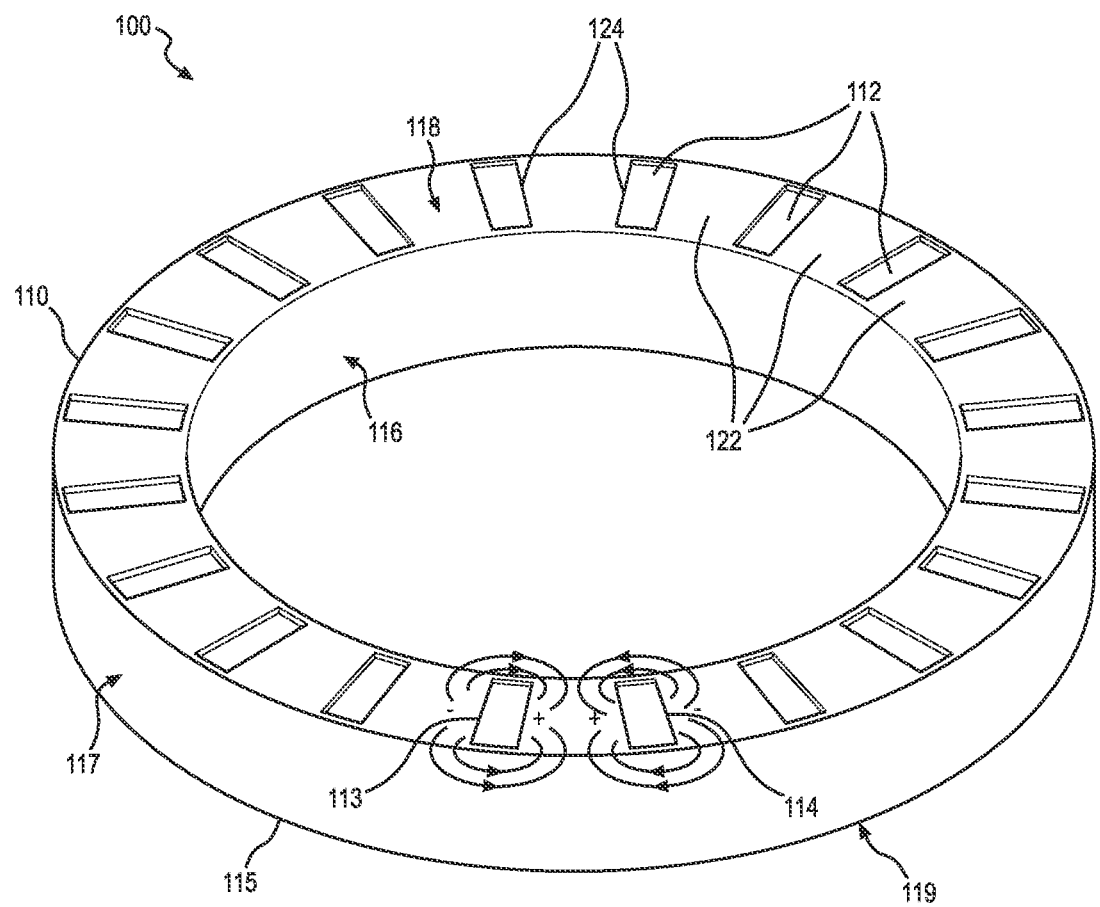
FIG. 6 is a schematic representation of the system.

In one implementation, as observed in FIGS. 2 and 4, the system 100 includes a shaft 160 in alignment with the motor axis rigidly mounted to the rotor 110. In this implementation, the outer hook element 133 of each coil assembly couples the inner hook element 143 of each coil assembly to define a radial gap exposing a portion of the inner radial surface 116 of the rotor 110. The system 100 can then further include a disc 161 positioned within this radial gap and defining: a diameter substantially equal to an inner diameter of the body 115 of the rotor 110; and a circumference rigidly coupled to the inner radial surface 116 of the rotor 110. The shaft 160 is then rigidly coupled to the disc 161 and extends through a center of disc 161 in alignment with the motor axis, such that the shaft 160 begins to rotate in response to coupling of the magnetic elements of the rotor 110 with the magnetic field generated by the set of coil assemblies 131.

In one example, the set of coil assemblies 131 can be fabricated, such that, the disc 161 positioned within the radial gap and coupled to the rotor 110 can be located: flush with a top axial face of the rotor 110, flush with the bottom axial face of the rotor 110, or intermediate the top axial face and the bottom axial face of the rotor 110. In this example, the disc 161 can be either fabricated as an integral component of the rotor 110 or fabricated separately from the rotor 110 and then rigidly mounted (e.g., welded) to a particular height at the inner radial surface 116 of the rotor 110. The set of coil assemblies 131 can then be mounted radially about the rotor 110 to define the radial gap, such that the disc 161 can rotate freely within the radial gap (i.e., without contact to the set of coil assemblies 131).

Therefore, the disc 161: locates the shaft 160 in alignment with the motor axis of the rotor 110; and enables rotation of the shaft 160 about the motor axis with minimal components coupling the shaft 160 and the rotor 110, thereby reducing loss of torque and speed of the rotating shaft 160.

In one implementation, as observed in FIG. 2, rigidly coupling the disc 161 to the inner radial surface 116 of the rotor 110 prevents a length of the inner hook element 143 from extending entirely across the inner radial surface 116, which results in an imbalance of radial magnetic flux along the inner radial surface 116 and outer radial surface 117 of the rotor 110. In this implementation, the disc 161 includes a height tapering from a center of the disc 161 toward the circumference of the disc 161 rigidly coupled to the inner radial surface 116 of the rotor 110, thereby forming a conical profile for the disc 161. Therefore, the system 100 can: reduce transfer of the imbalance of radial forces resulting from magnetic flux coupling; and maintain the shaft 160 coupled to the rotor 110 spinning about the motor axis.

4. Stator

Generally, the system 100 includes a stator 130 including a set of coil assemblies 131, each including an outer hook element 133 including a first set of leads 155 and an inner hook element 143 including a second set of leads 156. The set of coil elements are arranged radially about the rotor 110 and configured to extend across each surface of the rotor 110, thereby generating a toroidal magnetic field about the rotor 110 in order to induce magnetic flux linkage across each surface of the rotor 110 and enable rotation of the rotor 110 within the set of coil assemblies 131.

4.1 Coil Assembly: Unitary Coil

Figure 3:
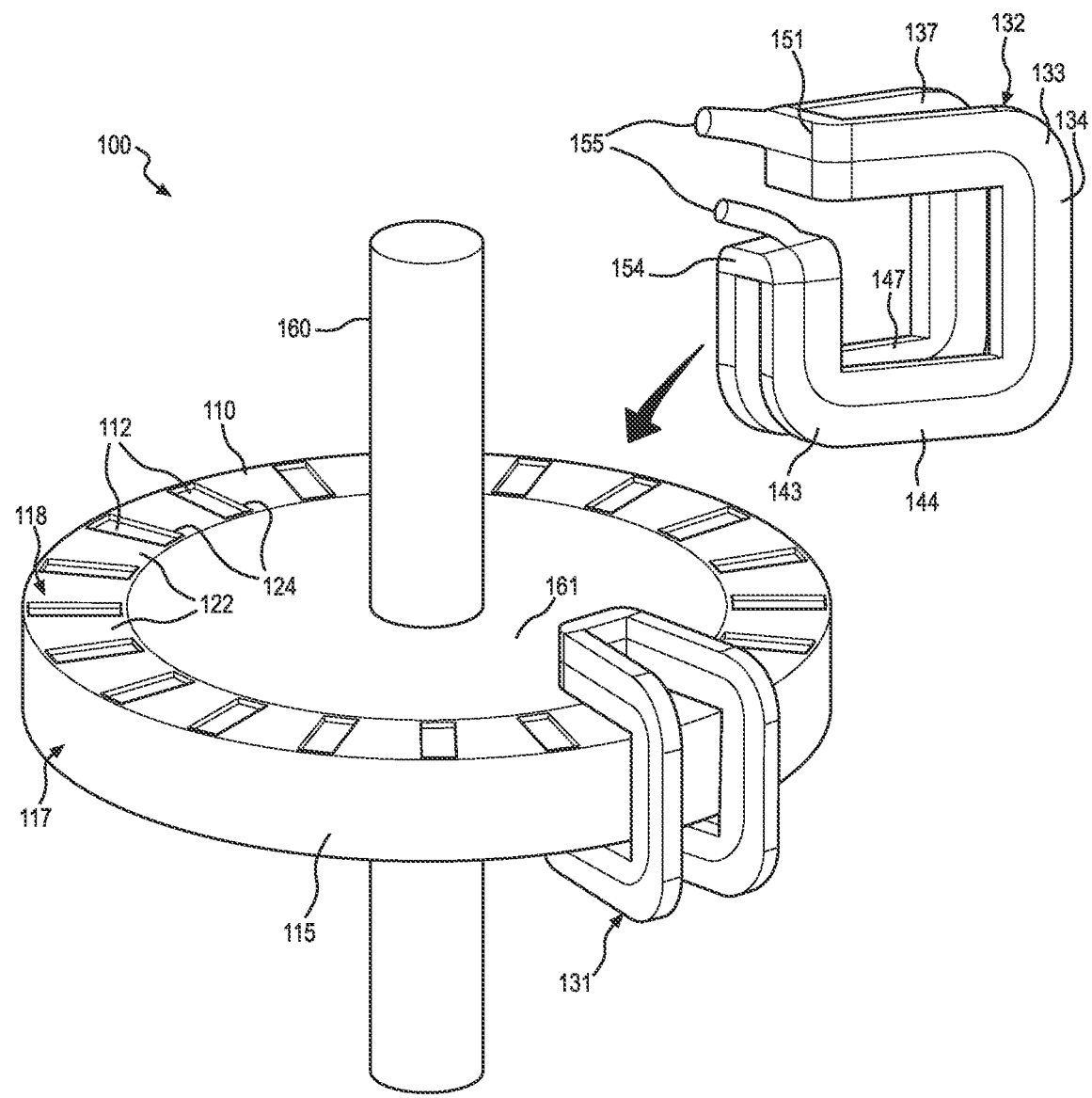
FIG. 3 is a schematic representation of the system.

In one implementation shown in FIG. 3, each coil in the set of coil assemblies 131 defines a single unitary winding extending across all surfaces of the rotor 110. In this implementation, the outer hook element 133 and the inner hook element 143 are integrally formed into the single unitary coil winding. For example, each coil can be wound about the rotor 110 such that the coil extends across the first axial face 118, second axial face 119, outer radial surface 117, and inner radial surface 116 of the rotor 110. Additionally, each coil includes a set of leads 155 which can be connected to the controller 190 or connected to other coils in the set of coil assemblies 131 to arrange the set of coils in series and/or in parallel to each other.

4.2 Coil Assembly: Hook Elements

In one implementation shown in FIGS. 2 and 4, the outer hook element 133 and the inner hook element 143 of each coil assembly in the set of coil assemblies 131 defines a continuous loop of wire (e.g., laminated copper wire) extending across surfaces of the rotor 110. In particular the outer hook element 133 and the inner hook element 143 can be connected to form a hook-wound coil profile extending across each surface of the rotor 110 and define a throat to locate the rotor 110 within the coil assembly. In this implementation, the outer hook elements 133 for the set of coil assemblies 131 can initially be mounted to the rotor 110. The inner hook elements 143 for the set of coil assemblies 131 can then be mounted to the rotor 110 in alignment with the outer hook elements 133, thereby locating the rotor 110 within coil assembly. The first set of leads 155 for the outer hook elements 133 can then connected in series with the second set of leads 156 for the inner hook elements 143.

In one example, the outer hook element 133 of the coil assembly includes a first outer hook branch 134 and a second outer hook branch 137. The first outer hook branch 134 defines: a first outer coil segment 135 extending across the first axial face 118 of the rotor 110; and a second outer coil segment 136 normal the first outer coil segment 135 and extending across the outer radial surface 117 of the rotor 110. The second outer hook branch 137 is congruent (i.e., same shape and size) to the first outer hook branch 134 and defines: a third outer coil segment 138 parallel the first outer coil segment 135 and extending across the first axial face 118 of the rotor 110; and a fourth outer coil segment 139. The fourth outer coil segment 139: is normal to the third outer coil segment 138; is parallel to the second outer coil segment 136; and extends across the outer radial surface 117 of the rotor 110. Furthermore, the outer hook element 133 includes: a first neutral coil segment 151 connecting the first outer coil segment 135 and the third outer coil segment 138; and a second neutral coil segment 152 connecting the second outer coil segment 136 and the fourth outer coil segment 139 to define a first L-shaped structure.

In the foregoing example, the inner hook element 143 of the coil assembly includes a first inner hook branch 144 and a second inner hook branch 147. The first inner hook branch 144 defines: a first inner coil segment 145 extending partially across the inner radial face of the rotor 110; and a second inner coil segment 146. The second inner coil segment 146: is normal the first inner coil segment 145; extends across the second axial face 119 of the rotor 110; and is connected to the second outer coil segment 136 of the first outer hook branch 134. The second inner hook branch 147 is congruent (i.e., same size and shape) to the first inner hook branch 144 and defines: a third inner coil segment 148 parallel the first inner coil segment 145 and extending partially across the inner radial face of the rotor 110; and a fourth inner coil segment 149. The fourth inner coil segment 149: is normal to the third inner coil segment 148; is parallel to the second inner coil segment 146; extends across the second axial face 119 of the rotor 110; and is connected to the fourth outer coil segment 139 of the second outer hook branch 137. The inner hook element 143 further includes: a third neutral coil segment 153 connecting the first inner coil segment 145 and the third inner coil segment 148; and a fourth neutral coil segment 154 connecting the second inner coil segment 146 and the fourth inner coil segment 149 to define a second L-shaped structure arranged normal to the first L-shaped structure to define the throat locating the rotor 110 within the coil assembly.

Therefore, the system 100 can: locate the rotor 110 within the set of coil assemblies 131; drive current through the continuous loop of the coil assembly to generate a toroidal magnetic field in order to induce a balanced magnetic flux linkage on the opposing axial faces of the rotor 110; and thereby enable rotation of the rotor 110 within the set of coil assemblies 131.

4.3 Coil Assembly: Multi-Coil Geometry

In one implementation of the system 100, each coil assembly in the set of coil assemblies includes a set of coil windings: arranged across each surface of the rotor 110; and forms a hook profile defining a throat configured to locate the rotor 110 within the coil assembly; and including a set of leads. As a result, the controller 190 can, independently or sequentially, drive current to each coil winding in the set of coil windings, thereby generating magnetic fields directed to surfaces of the rotor 110 in order to induce magnetic flux coupling across each surface of the rotor 110.

For example, the outer hook element 133 for each coil assembly in the set of coil assemblies 131 can include: a first coil winding extending across the first axial face 118 of the rotor 110 and including a first lead; and a second coil winding. The second winding: is normal to the first coil winding to define a first L-shaped structure; extends across the outer radial surface 117 of the rotor 110; is connected in series to the first coil winding; and includes a second lead.

Furthermore, the inner hook element 143 for each coil assembly in the set of coil assemblies 131 can include: a third coil winding extending partially across the inner radial surface 116 of the rotor 110 and including a third lead; and a fourth coil winding. The fourth coil winding: is normal to the third coil winding to define a second-L shaped structure cooperating with the first L-shaped structure to form the throat configured to locate the rotor 110 within the coil assembly; extends across the second axial face 119 of the rotor 110; is connected in series to the third coil winding; and includes a fourth lead.

Therefore, the system 100 can: drive current to the outer hook element 133 and the inner hook element 143 independent from each other; generate a toroidal magnetic field of varying magnetic field intensity enveloping the rotor 110; and thereby achieve a target magnetic flux balance across opposing axial faces of the rotor 110 and minimize magnetic flux imbalance across the inner radial surface 116 and outer radial surface 117 of the rotor 110.

4.4 Stator Poles

In one implementation, the system 100 includes a stator 130 including a set of ferrous elements 181: each arranged radially and axially about the set of coil assemblies 131; supporting the set of coil assemblies 131 to maintain the hook formation and locate the rotor 110 within the set of coil assemblies 131; and defining sets of stator poles generating magnetic fields directed to each surface of the rotor 110, thereby inducing a magnetic flux linkage across surfaces of the rotor 110 in order to rotate the rotor 110 within the set of coil assemblies 131. As a result, the rotor poles of the rotor 110 continuously attempt to align with stator poles of the stator 130, in response to driving current through the set of coils, and thereby rotating the rotor 110 within the set of coil assemblies 131.

For example, the set of ferrous elements 181 can include a first ferrous element 182: coupled to axial coil segments of the outer hook element 133 for each coil assembly in the set of coil assemblies 131; defining a first set of axial stator poles configured to mate intermediate the axial coil segments of the outer hook element 133 for each coil assembly in the set of coil assemblies 131; and configured to generate magnetic fields at each stator 130 pole, in the first set of axial stator poles, directed to the first axial face 118 of the rotor 110.

Additionally in this example, the set of ferrous elements 181 can also include a second ferrous element 184 coupled to axial coil segments of the inner hook element 143, for each coil assembly in the set of coil assemblies 131, opposite the axial coil segments of the outer hook element 133. The second ferrous element 184 defines a second set of axial stator poles: arranged in alignment with the first set of axial stator poles; and configured to mate intermediate the axial coil segments of the inner hook element 143 for each coil assembly in the set of coil assemblies 131. The second ferrous element 184 is configured to generate magnetic fields at each stator pole, in the second set of axial stator poles, directed to the second axial face 119 of the rotor 110. In this example, the first ferrous element 182 defines a thickness similar to a thickness of the second ferrous element 184 thereby generating a balanced magnetic field directed to the first axial face 118 and the second axial face 119 of the rotor 110.

In the foregoing example, the set of ferrous elements 181 can also include: a third ferrous element 186: coupled to outer radial coil segments of the outer hook element 133, for each coil assembly in the set of coil assemblies 131; defining a set of outer radial stator poles 187 of a first height configured to mate intermediate the outer radial coil segments, of the outer hook elements 133, for each coil assembly in the set of coil assemblies 131; and configured to generate magnetic fields at each stator 130 pole, in the set of outer radial stator poles 187, directed to the outer radial surface 117 of the rotor 110.

Furthermore, the set of ferrous elements 181 can include a fourth ferrous element 188 coupled to inner radial coil segments of the inner hook element 143, for each coil assembly in the set of coil assemblies 131, opposite the outer radial coil segments of the outer hook element 133. The fourth ferrous element 188 can define a set of inner radial stator poles 189 of a second height less than the first height of the set of outer radial stator poles 187. The set of inner radial stator poles 189: are arranged in alignment with the set of outer radial stator poles 187; and configured to mate intermediate the inner radial coil segments of the inner hook element 143, for each coil assembly, in the set of coil assemblies 131. The fourth ferrous element 188 is configured to generate magnetic fields at each stator 130 pole, in the set of inner radial stator poles 189, directed to the inner radial surface 116 of the rotor 110. In this example, the height difference of the set of outer radial stator poles 187 and the set of inner radial stator poles 189 results in an imbalance between the magnetic fields directed to the radial surfaces of the rotor 110.

Therefore, the ferrous elements can: support the set of coil assemblies 131 to maintain engagement with the rotor 110, thereby eliminating the need for a yoke to support the rotor 110; generate magnetic fields directed to each surface of the rotor 110 to increase speed and torque output by the shaft 160; and induce balanced axial forces across each axial face of the rotor 110, thereby axially stabilizing the rotor 110 when rotating within the set of coil assemblies 131.

In one implementation, each ferrous element in the set of ferrous elements 181 can include a set of laminated ferrous sheets arranged parallel a magnetic flux distribution induced on the ferrous element and perpendicular a direction of rotation for the rotor 110, thereby reducing the number of Eddy currents formed on the ferrous element. In one example, the ferrous element can be fabricated by stacking parallel rings of laminated ferrous sheet to achieve a particular height and thickness for the set of stator poles. In another example, the ferrous element can be fabricated by compressing a strip of ferrous material into a helical spring, thereby forming the set of laminated ferrous sheets for the ferrous element.

Additionally or alternatively, the ferrous elements can be manufactured from iron powders.

4.5 Coil Arrangement: 180 Degrees

Figure 9:
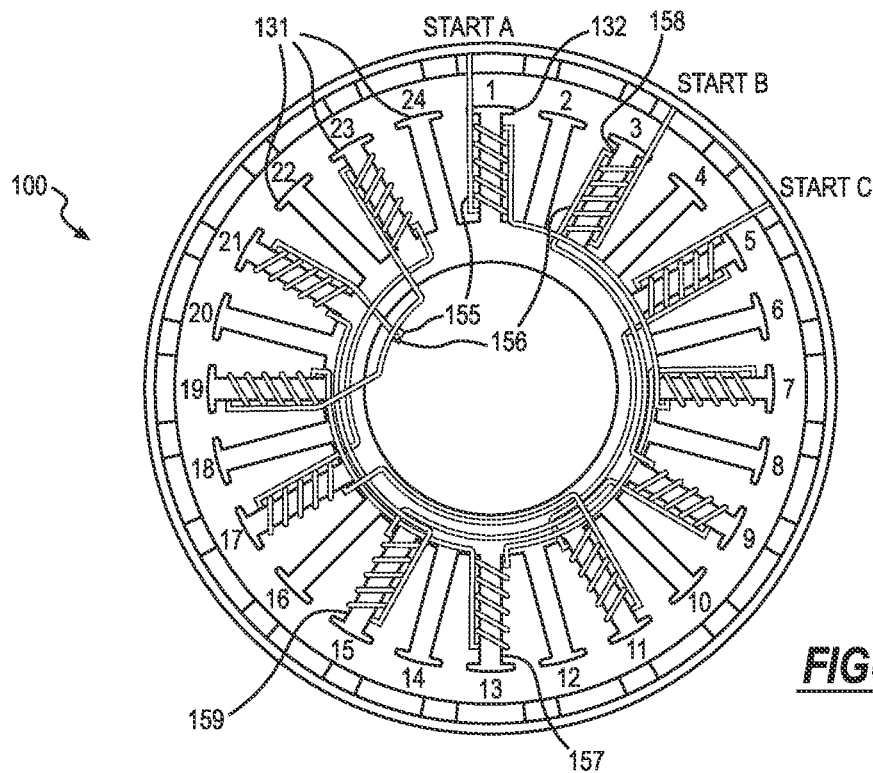
FIG. 9 is another schematic representation of one variation of the system.

In one implementation observed in FIG. 9, the set of coil assemblies 131 can include subsets of coil assemblies arranged to form a three-phase configuration (e.g., delta configuration, wye configuration) for the stator 130. In this implementation, these subsets of coil assemblies can include coil assemblies connected in series to each other and arranged at opposing angular offsets (i.e., 180-degree offset) about the rotor 110. As a result, the controller 190 can then be configured to sequentially drive current to these subsets of coil assemblies in order to sequentially generate the magnetic fields directed to the surfaces of the rotor 110.

For example, the set of coil assemblies 131 can include a first subset of coil assemblies 131 including: a first coil assembly 132; and a second coil assembly 157 connected in series with the first coil assembly 132 and arranged 180 degrees opposite the first coil assembly 132. Additionally, the set of coil assemblies 131 can include a second subset of coil assemblies 131 including: a third coil assembly 158 angularly offset from the first coil assembly 132; and a fourth coil assembly 159 arranged 180 degrees opposite the third coil assembly 158 and connected in series with the third coil assembly 158. In this example, the controller 190 can then sequentially drive current to the first subset of coil assemblies 131 and the second subset of coil assemblies 131 to sequentially generate magnetic fields about the rotor 110 that couple the set of magnetic elements 112 in the rotor 110 to enable rotation of the rotor 110.

Additionally, the set of coil assemblies 131 can also include a third subset of coil assemblies 131 arranged in a similar configuration as described above to form the three-phase configuration for the set of coil assemblies 131 of the stator 130.

Therefore, the system 100 can: sequentially generate opposing magnetic fields at the set of coil assemblies 131 directed to each surface of the rotor 110, in order to sequentially induce magnetic flux coupling to the rotor 110 within the set of coil assemblies 131, and thereby continuously urge the rotor 110 poles of the rotor 110 to align with the stator poles of the stator 130 to rotate the rotor 110 within the set of coil assemblies 131.

4.6 Coil Arrangement: 120 Degrees

Figure 10:
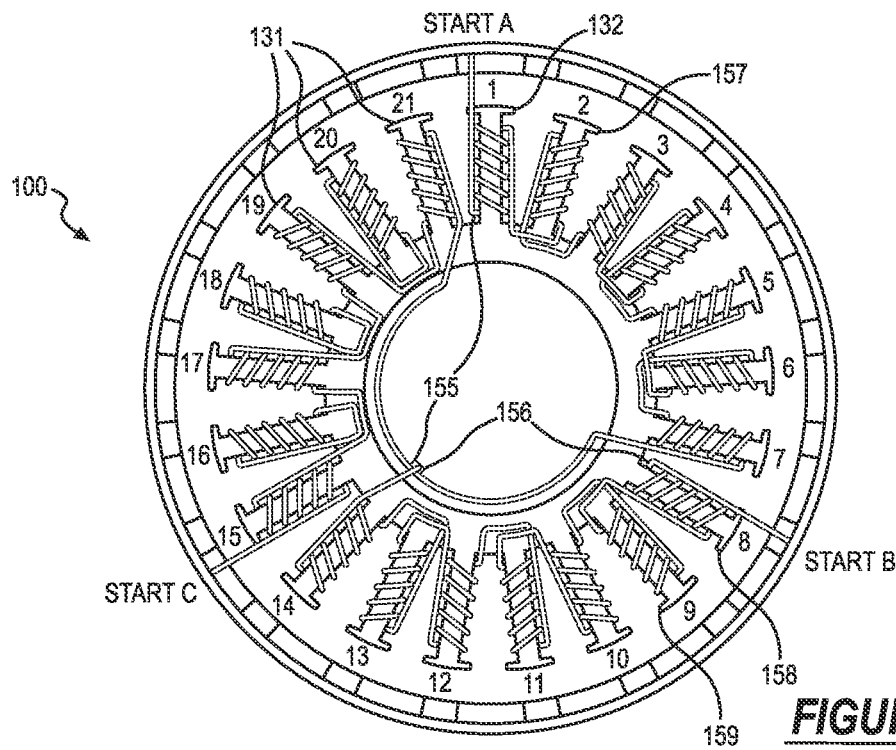
FIG. 10 is another schematic representation of one variation of the system.

In one implementation observed in FIG. 10, the subsets of coil assemblies can include coil assemblies connected in series to each other and arranged at 120-degree offsets about the rotor 110. As a result, the controller 190 can then be configured to sequentially drive current to these subsets of coil assemblies in order to sequentially generate the magnetic fields directed to the surfaces of the rotor 110.

For example, the set of coil assemblies 131 can include a first subset of coil assemblies 131 including: a first coil assembly 132; and a second coil assembly 157 connected in series with the first coil assembly 132 and arranged adjacent the first coil assembly 132. Additionally, the set of coil assemblies 131 includes a second subset of coil assemblies 131 including: a third coil assembly 158 angularly offset 120 degrees from the first coil assembly 132; and a fourth coil assembly 159 connected in series with the third coil assembly 158 and arranged adjacent the third hook assembly. In this example, the controller 190 can then be configured to sequentially drive current to the first subset of coil assemblies 131 and the second subset of coil assemblies 131 to sequentially generate magnetic fields about the rotor 110 that couple the set of magnetic elements 112 and enable rotation of the rotor 110 within the set of coil assemblies 131.

Additionally, the set of coil assemblies 131 can also include a third subset of coil assemblies 131 arranged in a similar configuration as described above to form the three-phase configuration for the stator 130.

Therefore, the system 100 can: sequentially generate magnetic fields at offsets of 120-degrees directed to each surface of the rotor 110, in order to sequentially induce magnetic flux coupling to the rotor 110 within the set of coil assemblies 131, and thereby continuously urge the rotor poles of the rotor 110 to align with the stator poles of the stator 130 to rotate the rotor 110 within the set of coil assemblies 131.

4.7 Coil Leads

In one implementation, the first set of leads 155 of the outer hook element 133 is connected in series with a second set of leads 156 for the inner hook element 143. For example, the first set of leads 155 can include a start lead and a first connecting lead. Additionally, the second set of leads 156 can include a second connecting lead and an end lead. In this example, the first connecting lead and the second connecting lead can be connected in series, thereby connecting the outer hook element 133 and the inner hook element 143 in series. Therefore, the set of coil assemblies 131 includes a start lead and an end lead; and the controller 190 can drive a current signal through the start lead to generate magnetic fields at the outer hook element 133 and the inner hook element 143.

In this example, a three-phase configuration including a first subset of coil assemblies 131, a second subset of coil assemblies 131, and a third subset of coil assemblies 131 will result in a set of 3 start leads and 3 end leads for a total of 6 leads.

In another implementation, the first set of leads 155 of the outer hook element 133 is connected parallel with the second set of leads 156 of the inner hook element 143. For example, the first set of leads 155 can include a first start lead and a first end lead each connected to the controller 190. Additionally, the second set of leads 156 can include a second start lead and a second end lead, each connected to the controller 190. Therefore, the controller 190 can: drive a first current signal of a first amplitude through the first set of leads 155 to generate a first magnetic field of a first strength at the outer hook element 133; and drive a second current signal of a second amplitude, greater than the first amplitude, through the second set of leads 156 to generate a second magnetic field of a second strength at the inner hook element 143; and thereby direct magnetic fields of varying field strength across all surfaces of the rotor 110.

In the aforementioned example, a three-phase configuration including a first subset of coil assemblies 131, a second subset of coil assemblies 131, and a third subset of coil assemblies 131 will result in a set of 6 start leads and 6 end leads for a total of 12 leads In this implementation, the set of leads can be grouped together and connected to a terminal casing, which can be located externally from the rotor 110 and stator 130. The leads in the terminal casing can then be configured into a particular three-phase configuration (e.g., delta connection, wye connection) for the subsets of coil assemblies. Therefore, the system 100 can group all connections for the stator 130 to a particular location and thereby mitigate exposure to elements (e.g., water) and conditions (e.g., high-temperatures), which can compromise operation of the system 100.

5. Housing

In one implementation, the system 100 includes a housing 172 defining a cavity locating the rotor 110 and the stator 130 within the cavity of the housing 172. In this implementation the housing 172 supports the set of ferrous elements 181 of the stator 130 on all sides (i.e., axial sides and radial sides) in order to secure the rotor 110 within the set of coil assemblies 131 and mitigate radial imbalances resulting from offset magnetic flux linkage induced from the inner radial stator poles and the outer radial stator poles.

For example, the housing 172 can include: a base 173 defining an inner circumference and an outer circumference; an inner radial wall 175 arranged about the inner circumference of the base 173; an outer radial wall 174 arranged about the outer circumference of the base 173; and a cover 176 arranged over the inner radial wall 175 and the outer radial wall 174 opposite the base 173 and defining the cavity within the housing 172. Therefore, in this example, the housing 172 can define a toroidal cylinder with the cavity configured to locate the rotor 110 and stator 130 within the housing 172.

Furthermore, in this example, to maintain the set of coil assemblies 131 in engagement with the rotor 110, the stator 130 within the cavity of the housing 172 can locate: the first ferrous element 182 in abutting engagement with the cover 176 of the housing 172; the second ferrous element 184 in abutting engagement with the base 173 of the housing 172; the third ferrous element 186 in abutting engagement with the outer radial wall 174 of the housing 172; and the fourth ferrous element 188 in abutting engagement with the inner radial wall 175 of the housing 172.

Therefore, the housing 172: rigidly locates the stator 130 and the coil within the cavity of the housing 172; and can eliminate the need for a yoke mounted to the rotor 110 in order to support the rotor 110 within the housing 172. Furthermore, the housing 172 can stabilize the offset imbalanced radial forces of the rotor 110, resulting from the set of inner radial stator poles 189 and outer radial stator poles, by rigidly supporting the stator 130 between the inner radial wall 175 and outer radial wall 174 of the housing 172.

Additionally, the system 100 can include an external cooling system (e.g., air cooling, liquid cooling) configured to apply coolant to outer surfaces of the housing 172 and thereby reduce the internal temperature of the housing 172 due to convection between the housing 172 and the internally located rotor 110 and stator 130.

In one implementation, the inner radial gap of the housing 172 defines a radial gap in alignment with the radial gap formed by the set of coil assemblies 131 mounted about the stator 130. In this implementation, the disc 161 can extend through the radial gap of the housing 172 and the radial gap of the set of coil assemblies 131 in order to rigidly couple the inner radial surface 116 of the rotor 110.

In one implementation, the set of leads for the set of coil assemblies 131 can be grouped together and connected to an internal terminal casing located within the cavity of the housing 172 or connected to an external terminal casing mounted to an outer surface of the housing 172.

6. Controller

In one implementation, the system 100 includes the controller 190 configured to drive current (e.g., AC current, DC current) through the set of coil assemblies 131 to generate a magnetic field at the set of stator poles coupling the magnetic elements within the body 115 of the rotor 110, thereby rotating the rotor 110 within the set of coil assemblies 131.

In one example, the controller 190 can be configured to switch polarity of current supplied to the set of coil assemblies 131 in order to enable rotation of the rotor 110. Furthermore, the controller 190 can be configured to modulate frequency and amplitude of the current supplied to the set of coil assemblies 131, thereby modifying speed and direction of rotation for the shaft 160 coupled to the rotor 110 in order to satisfy a particular mode of operation (e.g., pump motor operation, vehicle motor operation) for the electric motor.

7. Example: Submerged Pump Motor

In one implementation, the system 100 is configured to function as a submerged pump motor, such as a 4500-rpm pump motor operating at 25 kilowatts, for municipal applications. In this implementation, the housing 172 is submerged in water and, therefore, the rotor 110 and stator 130 within the cavity of the housing 172 must be sealed within the housing 172 to prevent water from interacting with the set of stator coils resulting in failure of operation for the motor. The cavity of the housing 172 can then be filed with a lubricating fluid (e.g., silicon oil) configured to fill the cavity within the housing 172 and envelop the rotor 110 and stator 130 within the housing 172.

In one example, the housing 172 includes: a base 173; an outer radial wall 174 extending from the base 173; and a cover 176 arranged over the base 173 and coupled to the outer radial wall 174 extending from the base 173 to define a cavity configured to locate the rotor 110 and the stator 130 within the housing 172. Additionally, the housing 172 can include: a first inner radial wall extending from the base 173; and a second inner radial wall extending from the cover 176 to define a radial gap in alignment with the radial gap formed by the set of coil assemblies 131 exposing a portion of the inner radial surface 116 of the rotor 110.

In this example, the disc 161, rigidly coupled to the inner radial surface 116 of the rotor 110 and supporting the shaft 160, is positioned within the radial gap of the housing 172 and the radial gap formed by the set of coil assemblies 131. As a result, the radial gap along the inner radial wall 175 of the housing 172 can allow for water to enter the cavity of the housing 172 and, thereby, short stator 130 within the housing 172. To prevent water from entering through this radial gap, the system 100 can include: a first bearing 177 arranged about the first inner radial wall of the housing 172 and coupled to a first face of the disc 161; and a second bearing 178 arranged about the second inner radial wall of the housing 172 and coupled to a second face of the disc 161 opposite the first face.

Therefore, the bearings coupled to the housing 172 enable the disc 161 to rotate freely about the inner radial of the housing 172 while sealing the radial gap of the housing 172, thereby preventing liquids and debris from entering the cavity of the housing 172 and interacting with the stator 130 within the housing 172.

Furthermore, the fluid (e.g., silicon oil) is disposed within the housing 172 and configured to fill the cavity locating the rotor 110 and the stator 130 within the housing 172. Therefore, in the event of the water entering the cavity of the housing 172, the density of the fluid within the cavity will prevent water from interacting with the stator 130 located within the housing 172.

8. Variation: Tubular Shaft

In one variation, as observed in FIGS. 7 and 8, the system 100 includes a tubular shaft 162 rigidly mounted to the first axial face 118 of the rotor 110. In this implementation, the outer hook element 133 of each coil assembly couples the inner hook element 143 of each coil assembly to define a radial gap exposing a portion of the first axial face 118 of the rotor 110. The tubular shaft 162 can then be positioned within this radial gap and defines: a shaft 160 diameter greater than an inner diameter of the rotor 110 and less than an outer diameter of the rotor 110; and a first end rigidly coupled to the first axial face 118 of the rotor 110. The tubular shaft 162, rigidly coupled to the rotor 110, rotates about the motor axis in response to coupling of the magnetic elements of the rotor 110 with the magnetic field generated by the set of coil assemblies 131.

8.1 Coil Assembly: Tubular Shaft

In one implementation of this variation of the system 100, each coil assembly in the set of coil assemblies 131 includes: an outer hook element 133 including a first set of leads 155 and an inner hook element 143 including a second set of leads 156. The inner hook element 143 is arranged normal to the outer hook portion to define a throat locating the rotor 110 within the set of coil assembly. In this variation, the outer hook element 133 and the inner hook element 143 extend across each surface of the rotor 110 to generate a toroidal magnetic field in order to induce: a balanced magnetic flux linkage across the inner radial surface 116 and outer radial surface 117 of the rotor 110; and an imbalanced magnetic flux linkage across opposing axial faces of the rotor 110.

For example, the outer hook element 133 for the coil assembly includes a first outer hook branch 134 and a second outer hook branch 137. The first outer hook branch 134 defines: a first outer coil segment 135 extending partially across the first axial face 118 of the rotor 110; and a second outer coil segment 136 normal to the first outer coil segment 135 and extending across the outer radial surface 117 of the rotor 110. The second outer hook branch 137 is congruent (i.e., same shape and size) to the first outer hook branch 134 and defines: a third outer coil segment 138 parallel to the first outer coil segment 135 and partially extending across the first axial face 118 of the rotor 110; and a fourth outer coil segment 139. The fourth outer coil segment 139: is normal to the third outer coil segment 138; is parallel to the second outer coil segment 136; and extends across the outer radial surface 117 of the rotor 110. The outer hook element 133 further includes: a first neutral coil segment 151 connecting the first outer coil segment 135 and the third outer coil segment 138; and a second neutral coil segment 152 connecting the second outer coil segment 136 and the fourth outer coil segment 139 to define a first L-shaped structure.

In this foregoing example, the inner hook element 143 for the coil assembly includes a first inner hook branch 144 and a second inner hook branch 147. The first inner hook branch 144 defines: a first inner coil segment 145 extending across the inner radial face of the rotor 110; and a second inner coil segment 146. The second inner coil segment 146: is normal to the first inner coil segment 145; and extends across the second axial face 119 of the rotor 110. The second inner hook branch 147 is congruent (i.e., same shape and size) to the first inner hook branch 144 and defines: a third inner coil segment 148 parallel to the first inner coil segment 145 and extending across the inner radial face of the rotor 110; and a fourth inner coil segment 149. The fourth inner coil segment 149: is normal to the third inner coil segment 148; is parallel to the second inner coil segment 146; and extends across the second axial face 119 of the rotor 110. The inner hook element 143 further includes a third neutral coil segment 153 connecting the first inner coil segment 145 and third inner coil segment 148; and a fourth neutral coil segment 154 connecting the second inner coil segment 146 and the fourth inner coil segment 149 to define a second L-shaped structure arranged normal to the first L-shaped structure to define the throat locating the rotor 110 within the coil assembly.

Therefore, the system 100 can: locate the rotor 110 within the set of coil assemblies 131; drive current through the continuous loop of the coil assembly to generate a toroidal magnetic field in order to induce a balanced magnetic flux linkage on the inner radial surface 116 and outer radial surface 117 of the rotor 110; and, thereby, enable rotation of the rotor 110 within the set of coil assemblies 131.

8.2 Stator Poles: Tubular Shaft

In one implementation, as described above, the system 100 includes a stator 130 including a set of ferrous elements 181: each arranged radially and axially about the set of coil assemblies 131; supporting the set of coil assemblies 131 to maintain the hook formation and locate the rotor 110 within the set of coil assemblies 131; and defining sets of stator poles generating magnetic fields directed to each surface of the rotor 110, thereby inducing a magnetic flux linkage across surfaces of the rotor 110 in order to rotate the rotor 110 within the set of coil assemblies 131. In this variation of the system 100, the ferrous elements arranged about an outer radial and inner radial of the set of coil assemblies 131 define a similar height, such that balanced radial forces are applied to the rotor 110. Furthermore, the ferrous elements arranged about the top axial side and bottom axial side of the set of coil assemblies 131 each define a particular thickness, such that imbalanced axial forces are applied to the rotor 110.

For example, the set of ferrous elements 181 can include a first ferrous element 182: coupled to axial coil segments of the outer hook element 133, for each coil assembly in the set of coil assemblies 131; defining a first set of axial stator poles of a first thickness configured to mate intermediate the axial coil segments, of the outer hook element 133, for each coil assembly in the set of coil assemblies 131; and configured to generate magnetic fields at each stator 130 pole, in the first set of axial stator poles, directed to the first axial face 118 of the rotor 110.

Additionally, the set of ferrous elements 181 can include a second ferrous element 184: coupled to axial coil segments of the inner hook element 143, for each coil assembly in the set of coil assemblies 131, opposite the axial coil segments of the outer hook element 133; and defining a second set of axial stator poles of a second thickness greater than the first thickness of the first set of axial stator poles. The second set of axial stator poles: are arranged in alignment with the first set of axial stator poles; and configured to mate intermediate the axial coil segments of the inner hook element 143, for each coil assembly, in the set of coil assemblies 131. In this example, the second set of axial stator poles are configured to generate magnetic fields at each stator 130 pole, in the second set of axial stator poles, directed to the second axial face 119 of the rotor 110, and, thereby, induces an imbalanced magnetic flux linkage across axial faces of the rotor 110.

In the foregoing example, the set of ferrous elements 181 can include a third ferrous element 186: coupled to outer radial coil segments of the outer hook element 133, for each coil assembly in the set of coil assemblies 131; defining a set of outer radial stator poles 187 configured to mate intermediate the outer radial coil segments of the outer hook element 133, for each coil assembly, in the set of coil assemblies 131; and configured to generate magnetic fields at each stator 130 pole, in the set of outer radial stator poles 187, directed to the outer radial surface 117 of the rotor 110.

Furthermore, the set of ferrous elements 181 can include a fourth ferrous element 188: coupled to inner radial segments of the inner hook element 143, for each coil assembly in the set of coil assemblies 131, opposite the outer radial segments of the outer hook element 133; and defining a set of inner radial stator poles 189. The set of inner radial stator poles 189: are arranged in alignment with the set of outer radial stator poles 187; and configured to mate intermediate the inner coil segments of the inner hook element 143 for each coil assembly, in the set of coil assemblies 131. In this example, the set of inner radial stator poles 189 are configured to generate magnetic fields at each stator 130 pole, in the set of inner radial stator poles 189, directed to the inner radial surface 116 of the rotor 110, and thereby induces a balanced magnetic flux linkage across radial surfaces of the rotor 110.

Therefore, in this variation of the system 100, the ferrous elements can: support the set of coil assemblies 131 to maintain engagement with the rotor 110, thereby eliminating the need for a yoke to support the rotor 110; generate magnetic fields directed to each surface of the rotor 110 to increase speed and torque output by the shaft 160; and induce balanced radial forces across each radial face of the rotor 110, thereby stabilizing the rotor 110 in the radial direction when rotating within the set of coil assemblies 131.

8.3 Housing: Tubular Shaft

In one implementation, the system 100 can include a housing 172: locating the tubular structure on a top axial face of the housing 172; and configured to stabilize imbalanced axial forces of the rotor 110 resulting in vertical propagation of the rotor 110 within the cavity of the housing 172.

In one example, the housing 172 can include: a base 173 defining an inner circumference and an outer circumference; an inner radial wall 175 arranged about the inner circumference of the base 173; an outer radial wall 174 arranged about the outer circumference of the base 173; and a cover 176 arranged over the inner radial wall 175 and the outer radial wall 174 opposite the base 173 and defining a cavity within the housing 172 and a radial gap cooperating with a radius of the tubular structure.

In this example, the stator 130 is located within the housing 172 and locates: the first ferrous element 182 in abutting engagement with the cover 176 of the housing 172; the second ferrous element 184 in abutting engagement with the base 173 of the housing 172; the third ferrous element 186 in abutting engagement with the outer radial wall 174 of the housing 172; and the fourth ferrous element 188 in abutting engagement with the inner radial wall 175 of the housing 172.

As described above, the varying thickness of the first ferrous element 182 and the second ferrous element 184 results in offset axial forces acting upon the rotor 110 within the set of coil assemblies 131, causing the rotor 110 and stator 130 to propagate vertically within the housing 172. Therefore, the tubular structure can extend through the radial gap and couple to the cover 176 via a thrust bearing 179 configured to stabilize vertical propagation of the rotor 110 resulting from imbalanced axial forces.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for an electric motor comprising:
 a set of magnetic elements arranged radially about a motor axis within a body, the body defining:
  an inner radial surface;
  an outer radial surface;
  a first axial face; and
  a second axial face opposite the first axial face;
 a set of coil assemblies arranged in a radial pattern about the body, a first coil assembly in the set of coil assemblies comprising:
  a first coil winding extending across the first axial face and the outer radial surface of the body; and
  a second coil winding:
   extending across the second axial face of the body; and
   arranged orthogonal to the first coil winding to define a throat configured to locate the body within the coil assembly; and
 a shaft coupled to the body and coaxial with the motor axis.

2. The system of claim 1, further comprising a controller configured to supply current through the set of coil assemblies to generate a toroidal magnetic field configured to envelop the body and couple the set of magnetic elements of the body thereby rotating the body while embedded within the set of coil assemblies.

3. The system of claim 1, wherein a second coil assembly, in the set of coil assemblies, comprises:
 a third coil winding extending across the first axial face and the outer radial surface of the body to form an L-shaped structure; and
 a fourth coil winding:
  extending across the second axial face, opposite the first axial face, of the body;
  arranged orthogonal the third coil winding; and
  coupling the third winding to form a C-shaped structure enveloping the body.

4. The system of claim 1, wherein a second coil assembly, in the set of coil assemblies, comprises:
 a third coil winding extending across the first axial face and the outer radial surface of the body to form a first L-shaped structure enveloping the body; and
 a fourth coil winding:
  extending across the second axial face, opposite the first axial face, of the body;
  extending across the inner radial surface of the body;
  arranged orthogonal the third coil winding to form a second L-shaped structure enveloping the body; and
  coupling the third winding to form the throat configured to locate the body within the coil assemblies.

5. The system of claim 1, wherein the first coil winding of the first coil assembly comprises:
 a first outer hook branch comprising:
  a first outer coil segment extending across the first axial face of the body; and
  a second outer coil segment normal the first outer coil segment and extending across the outer radial surface of the body;
 a second outer hook branch extending from the first outer hook branch and comprising:
  a third outer coil segment parallel the first outer coil segment and extending across the first axial face of the body; and
  a fourth outer coil segment:
   normal the third outer coil segment;
   parallel the second outer coil segment; and
   extending across the outer radial surface of the body;
 a first neutral coil segment connecting the first outer coil segment and the third outer coil segment; and
 a second neutral coil segment connecting the second outer coil segment and the third outer coil segment to define a first L-shaped structure.

6. The system of claim 5, wherein the second coil winding of the first coil assembly comprises:
 a first coil segment extending across the second axial face, opposite the first axial face, of the body;
 a second coil segment arranged parallel the first coil segment and extending across the second axial face of the body;
 the first neutral coil segment connecting a first end of the first coil segment and the second coil segment; and
 the second neutral coil segment connecting a second end, opposite the first end, of the first coil segment and the second coil segment to form the second coil winding facing the second axial face of the body, the second coil winding cooperating the first coil winding to form a C-shaped structure enveloping the body.

7. The system of claim 1, wherein the second coil winding, of each coil assembly in the set of coil assemblies, extends across the inner radial surface of the body and cooperates with the first coil winding envelop the body containing the set of magnetic elements.

8. The system of claim 1:
 wherein the body comprises a unitary cylindrical structure defining a set of slots fabricated radially about the unitary cylindrical structure;
 wherein each magnetic element, in the set of magnetic elements:
  is arranged at a slot in the set of slots;
  extends a height of the body;
  extends a thickness of the body; and
  defines a rectangular geometry; and
 further comprising a set of pole spacers arranged intermediately the set of slots on the body, each pole spacer, in the set of pole spacers, comprising:
  a set of laminated metallic sheets arranged parallel to a flux distribution applied to the pole spacer and perpendicular a direction of rotation of the body; and
  a trapezoidal geometry cooperating with the rectangular geometry of an adjacent magnetic element, in the set of magnetic elements, to evenly distribute magnetic flux induced from the adjacent magnetic element across each surface of the pole spacer.

9. The system of claim 1, wherein the set of magnetic elements arranged within body comprises a first subset of magnetic elements comprises:
 a first magnetic element arranged in a first pole orientation within the body;
 a second magnetic element:
  radially offset the first magnetic element within body; and
  arranged in a second pole orientation, opposite the first pole orientation;
 a first pole spacer:
  arranged between the first magnetic element and the second magnetic element; and
  configured to evenly distribute magnetic flux from repelling magnetic forces between the first magnetic element and the second magnetic element.

10. The system of claim 1:
 wherein the first coil winding couples the second coil winding of each coil assembly, in the set of coil assemblies, to form a crescent structure exposing the inner radial surface of the body;
further comprising a disc coupled to the inner radial surface of the body, the disc defining:
a diameter substantially equal to an inner diameter of the body;
a circumference rigidly coupled to the inner radial surface of the body;
an origin in alignment with the motor axis;
a height tapering from the origin of the disc toward the circumference of the disc; and
wherein the shaft is rigidly coupled to the disc and extends through the origin of the disc in alignment to the motor axis.

11. The system of claim 1:
further comprising a housing comprising:
a base;
an outer radial wall extending from the base;
a cover arranged over the base and coupled to the outer radial wall extending from the base to define a cavity configured to locate the body containing the set of magnetic elements and the set of coil assemblies in the housing;
a first inner radial wall extending from the base; and
a second inner radial wall extending from the cover to define a radial gap exposing the inner radial surface of the body; and
wherein the shaft:
extends through the cover fourth the housing in alignment with the motor axis
couples the inner radial surface of the body through the radial gap;
comprises a first bearing coupling the shaft to the first inner radial wall of the housing; and
comprises a second bearing coupling the shaft to the second inner radial wall of the housing and cooperating with the first bearing to seal the radial gap of the housing.

12. The system of claim 1, wherein the set of coil assemblies further comprises:
a first ferrous element:
coupled to axial coil segments of the first coil winding for each coil assembly in the set of coil assemblies;
defining a set of axial stator poles configured to mate intermediate the axial coil segments of the first coil winding for each coil assembly in the set of coil assemblies; and
configured to generate magnetic fields at each stator pole, in the set of axial stator poles, directed to the first axial face of the body; and
a second ferrous element:
coupled to axial coil segments of the second coil winding, for each coil assembly, in the set of coil assemblies, opposite the axial coil segments of the first coil winding;
defining a second set of axial stator poles:
arranged in alignment with the first set of axial stator poles; and
configured to mate intermediate the axial coil segments of the second coil winding for each coil assembly in the set of coil assemblies; and
configured to generate magnetic fields at each stator pole, in the second set of axial stator poles, directed to the second axial face of the body, and balanced with magnetic fields generated from the first set of axial stator poles.

13. The system of claim 12, wherein the set of coil assemblies further comprises:
a third ferrous element:
coupled to outer radial coil segments of the first coil winding, for each coil assembly in the set of coil assemblies;
defining a set of outer radial stator poles of a first height configured to mate intermediate the outer radial coil segments, of the first coil winding, for each coil assembly in the set of coil assemblies; and
configured to generate magnetic fields at each stator pole, in the set of outer radial stator poles, directed to the outer radial surface of the body; and
a fourth ferrous element:
coupled to inner radial coil segments of the second coil winding, for each coil assembly in the set of coil assemblies, opposite the outer radial coil segments of the first winding;
defining a set of inner radial stator poles of a second height less than the first height of the set of outer radial stator poles, the set of inner radial stator poles:
arranged in alignment with the set of outer radial stator poles; and
configured to mate intermediate the inner radial coil segments of the second coil winding, for each coil assembly, in the set of coil assemblies; and
configured to generate magnetic fields at each stator pole, in the set of inner radial stator poles, directed to the inner radial surface of the body, and imbalanced with the magnetic fields generated from the set of outer radial stator poles.

14. The system of claim 13:
further comprising a housing comprising:
a base defining an inner circumference and an outer circumference;
an inner radial wall arranged about the inner circumference of the base;
an outer radial wall arranged about the outer circumference of the base; and
a cover arranged over the inner radial wall and the outer radial wall opposite the base; and
wherein the set of coil assemblies are located within the housing and locates:
the first ferrous element in abutting engagement with the cover of the housing;
the second ferrous element in abutting engagement with the base of the housing;
the third ferrous element in abutting engagement with the outer radial wall of the housing; and
the fourth ferrous element in abutting engagement with the inner radial wall of the housing.

15. The system of claim 1:
wherein the set of coil assemblies comprises:
a first subset of coil assemblies comprising:
a first coil assembly; and
a second coil assembly connected in series with the first coil assembly and arranged 180 degrees opposite the first coil assembly; and
a second subset of coil assemblies comprising:
a third coil assembly angularly offset from the first coil assembly; and
a fourth coil assembly connected in series with the third coil assembly and arranged 180 degrees opposite the third coil assembly; and
further comprising a controller configured to sequentially drive current to the first subset of coil assemblies and the second subset of coil assemblies to sequentially generate magnetic fields about the body that couple the set of magnetic elements and enable rotation of the body.

16. A system for an electric motor comprising:
a set of magnetic elements arranged radially about a motor axis within a body defining:
  an inner radial surface;
  an outer radial surface;
  a first axial face; and
  a second axial face opposite the first axial face;
a set of coil assemblies arranged in a radial pattern about the body, a first coil assembly in the set of coil assemblies:
  extending across the first axial face of the body;
  extending across the outer radial surface of the body;
  extending across the second axial face, opposite the first axial face, of the body; and
  forming a throat configured to locate the body within the coil assembly;
a shaft coupled to the inner radial surface of the body and aligned to the motor axis; and
a controller configured to drive current through the set of coil assemblies to generate a toroidal magnetic field configured to envelop the body and couple the set of magnetic elements of the body thereby rotating the body while embedded within the set of coil assemblies.

17. The system of claim 16, wherein the first coil assembly, in the set of coil assemblies, comprises:
a first coil winding extending across the first axial face and the outer radial surface of the body to form an L-shaped structure; and
a second coil winding:
  extending across the second axial face, opposite the first axial face, of the body;
  arranged orthogonal the first coil winding; and
  coupling the first winding to form a C-shaped structure enveloping the body.

18. The system of claim 16, wherein the first coil assembly, in the set of coil assemblies, comprises:
a first winding extending across the first axial face of the body;
a second winding extending across the outer radial surface of the body and arranged orthogonal the first winding; and
a third winding:
  extending across the second axial face, opposite the first axial face, of the body;
  arranged parallel the first winding and orthogonal to the second winding; and
  cooperating with the first winding and the second winding to form a C-shaped structure enveloping the body.

19. The system of claim 16, wherein the first coil assembly, in the set of coil assemblies, comprises:
a first coil winding extending across the first axial face and the outer radial surface of the body to form a first L-shaped structure enveloping the body; and
a second coil winding:
  extending across the second axial face, opposite the first axial face, of the body;
  extending across the inner radial surface of the body;
  arranged orthogonal the first coil winding to form a second L-shaped structure enveloping the body; and
  coupling the first winding to form the throat configured to locate the body within the coil assemblies.

20. A system for an electric motor comprising:
a set of magnetic elements arranged radially about a motor axis within a body defining:
  an inner radial surface;
  an outer radial surface;
  first axial face; and
  a second axial face opposite the first axial face;
a set of coil assemblies arranged in a radial pattern about the body, each coil assembly in the set of coil assemblies comprising:
  a first winding extending across the first axial face of the body;
  a second winding extending across the outer radial surface of the body and arranged orthogonal to the first winding; and
  a third winding extending across the second axial face of the body and arranged parallel to the first winding and orthogonal to the second winding, the third winding cooperating with the first winding and the second winding to define a throat configured to locate the body within the coil assembly; and
a shaft coupled to the body and aligned to the motor axis.

* * * * *

UNITED STATES PATENT AND TRADEMARK OFFICE
CERTIFICATE OF CORRECTION

PATENT NO. : 12,081,090 B2  
APPLICATION NO. : 18/099115  
DATED : September 3, 2024  
INVENTOR(S) : Abla Hariri et al.

Page 1 of 1

It is certified that error appears in the above-identified patent and that said Letters Patent is hereby corrected as shown below:

On the Title Page

In Item (72), "Abla Hariri, Granbury TX (US); Andrei Popov, Granbury TX (US); Erik Hatch, Granbury TX (US); John Langsdorf, Granbury TX (US); Mohit Gangireddy, Granbury TX (US)" should read as follows -- Abla Hariri, Granbury TX (US); Andrei Popov, Granbury TX (US); Erik Hatch, Granbury TX (US); John Langsdorf, Granbury TX (US); Mohit Gangireddy, Granbury TX (US); Cessar Aquirre, Granbury TX (US) --

Signed and Sealed this  
Twenty-eighth Day of October, 2025

John A. Squires  
*Director of the United States Patent and Trademark Office*